US010142533B2

(12) United States Patent
Kuo et al.

(10) Patent No.: US 10,142,533 B2
(45) Date of Patent: Nov. 27, 2018

(54) TECHNOLOGIES FOR CONTROLLING USER ACCESS TO IMAGE SENSORS OF A CAMERA DEVICE

(71) Applicant: Intel Corporation, Santa Clara, CA (US)

(72) Inventors: Chia-Hung S. Kuo, Folsom, CA (US); Tao Tao, Hillsboro, OR (US); Guru Raj, Hillsboro, OR (US); Richmond Hicks, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/671,705

(22) Filed: Mar. 27, 2015

(65) Prior Publication Data

US 2016/0286120 A1 Sep. 29, 2016

(51) Int. Cl.
| | |
|---|---|
| *H04N 5/225* | (2006.01) |
| *H04N 5/222* | (2006.01) |
| *H04N 3/02* | (2006.01) |
| *H04N 13/02* | (2006.01) |
| *H04N 5/232* | (2006.01) |
| *H04N 5/376* | (2011.01) |

(52) U.S. Cl.
CPC ....... *H04N 5/2258* (2013.01); *H04N 5/23245* (2013.01); *H04N 5/376* (2013.01)

(58) Field of Classification Search
CPC ........... H04N 13/0066; H04N 13/0282; H04N 13/02; G06F 17/30265; G08B 13/19671; G03B 35/00; G02B 27/22
USPC ..... 382/154; 348/262, 344, 333.11, 201, 47, 348/49, 50
See application file for complete search history.

(56) References Cited

U.S. PATENT DOCUMENTS

| | | |
|---|---|---|
| 2003/0020814 A1 | 1/2003 | Ono |
| 2003/0202101 A1 | 10/2003 | Monroe |

(Continued)

FOREIGN PATENT DOCUMENTS

| | | |
|---|---|---|
| JP | 2003-283650 | 10/2003 |
| JP | 2004-064350 | 2/2004 |

(Continued)

OTHER PUBLICATIONS

International Search Report for PCT/US16/019788, dated Jun. 23, 2016 (3 pages).

(Continued)

*Primary Examiner* — Xi Wang
(74) *Attorney, Agent, or Firm* — Barnes & Thornburg LLP (57) ABSTRACT

Technologies for managing access to image data streams generated by a plurality of image sensors of an image sensor array include a camera driver module. The camera driver module limits exposure to a user to all but one of the image sensors of the image sensor array. In some embodiments, the image sensor array may include a single primary image sensor that is exposed to the user and one or more secondary sensors that are not exposed to the user. In other embodiments, the image sensor array may include more than one primary image sensor and any number of secondary image sensors. In such an embodiment, only one of the primary image sensors are exposed to the user, and none of the secondary image sensors, if available, are exposed to the user. Other embodiments are described herein and claimed.

25 Claims, 5 Drawing Sheets

(56) References Cited

U.S. PATENT DOCUMENTS

| | | | |
|---|---|---|---|
| 2005/0179807 A1* | 8/2005 | Lin | G02B 26/0816 348/344 |
| 2006/0193509 A1 | 8/2006 | Criminisi | |
| 2006/0275025 A1* | 12/2006 | Labaziewicz | H04N 5/225 396/72 |
| 2007/0035628 A1* | 2/2007 | Kanai | H04N 5/2259 348/159 |
| 2007/0120988 A1* | 5/2007 | Akiyama | H04N 5/2254 348/240.99 |
| 2008/0211915 A1 | 9/2008 | McCubbrey | |
| 2008/0218613 A1* | 9/2008 | Janson | G03B 15/00 348/262 |
| 2008/0278608 A1 | 11/2008 | Kim | |
| 2009/0051804 A1* | 2/2009 | Nomura | H04N 5/2254 348/344 |
| 2009/0122154 A1 | 5/2009 | Lee | |
| 2010/0212024 A1* | 8/2010 | Marchese | G06F 17/3025 726/27 |
| 2010/0231743 A1 | 9/2010 | Choi | |
| 2010/0265177 A1* | 10/2010 | Fujimoto | G06T 11/00 345/162 |
| 2011/0074931 A1* | 3/2011 | Bilbrey | H04N 5/2258 348/48 |
| 2012/0313781 A1 | 12/2012 | Barker | |
| 2013/0077880 A1 | 3/2013 | Venkataraman | |
| 2013/0235234 A1* | 9/2013 | Cucci | H04N 5/23206 348/231.99 |
| 2014/0218612 A1 | 8/2014 | Belsarkar | |
| 2015/0304544 A1* | 10/2015 | Eguchi | H04N 5/23212 348/346 |

FOREIGN PATENT DOCUMENTS

| | | |
|---|---|---|
| KR | 10-2005-0090807 | 9/2005 |
| TW | 201334522 A | 8/2013 |

OTHER PUBLICATIONS

Written Opinion for PCT/US16/019788, dated Jun. 23, 2016 (6 pages).
Office Action and English Translation for Taiwan Patent Application No. 105105519, dated Mar. 21, 2017, 14 pages.
Extended European Search Report dated Sep. 3, 2018 for European patent application No. 16773674.3, 19 pages.

* cited by examiner

TECHNOLOGIES FOR CONTROLLING USER ACCESS TO IMAGE SENSORS OF A CAMERA DEVICE

BACKGROUND

Modern computing devices have become multi-faceted tools for personal, business, and social uses. A majority of the modern computing devices include one or more cameras capable of capturing still images (i.e., photos) and recording video streams in a number of formats at various resolutions. To capture the photos and record the video streams, the cameras capture light and convert the captured light into electrical signals using an image sensor. In order for the cameras to function within the environment of a computing device, each image sensor typically includes a driver (i.e., interface) that manages (i.e., translates) the communications between hardware of the computing device (e.g., a processor) and hardware of the camera (e.g., the image sensor). Traditionally, many cameras have included a single image sensor, and accordingly, a single driver; however, as cameras and the computing devices incorporating them therein have become more sophisticated, some cameras may include an array of image sensors. In such cameras, each image sensor may have a different driver, resulting in multiple image sensor drivers for a single camera. The image sensors of the image sensor array may allow for increased functionality over the single image sensor camera. For example, a camera that includes the image sensor array may include various image sensors that can be used to calculate depth and/or create a wider field of view (FOV).

Generally, vendors for the image sensors distribute an application programming interface (API) specific to that image sensor. The APIs typically allow access to certain functions and/or settings of the image sensors via software applications executed on the camera, and by way of the software application, a user of the camera. For example, in an image sensor array that contains a primary image sensor capable of capturing images at a high resolution and various other secondary image sensors capable of capturing images at lower resolutions than the primary image sensor, or performing other specialized features, the user may have to manually select one of the image sensors from the image sensor array to use to take a photograph with the camera. A preview of the photograph, typically presented to the user via a display of the computing device, may not clearly distinguish the differences (i.e., resolutions, viewing angles, etc.) between the image sensors. Accordingly, the user may unknowingly select an image sensor that has a viewing angle and/or resolution that might be undesirable.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
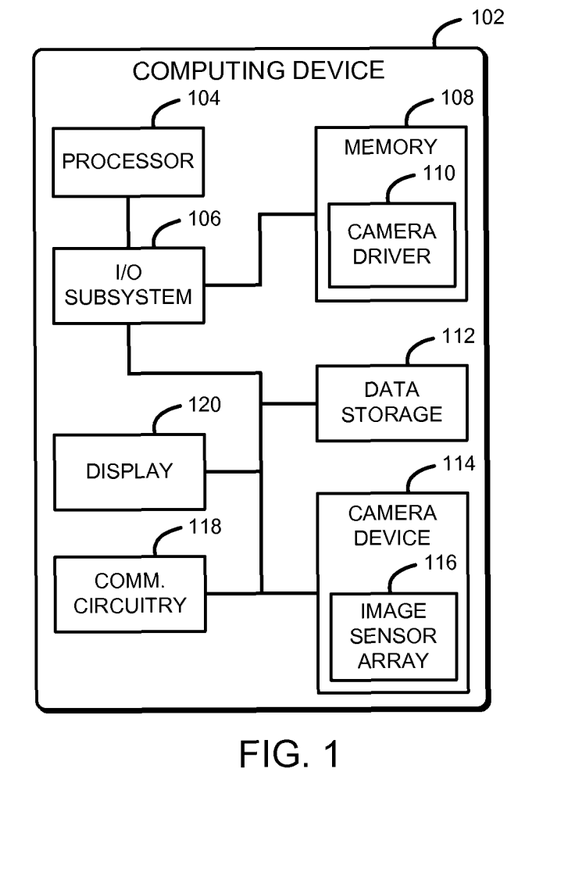
FIG. 1 is a simplified block diagram of at least one embodiment of a computing device for controlling user access to image sensors of a camera of the computing device.

Referring now to FIG. 1, an illustrative computing device 102 includes a camera device 114 having an image sensor array 116 including a number of individual image sensors capable of capturing light and converting the captured light into electrical signals for transformation into an image or image stream. To facilitate interaction with each image sensor, the computing device 102 may rely on a different driver for each of the image sensors of the image sensor array 116 in order to manage the communications between software applications of the computing device 102 and each of the image sensors. In some embodiments, any number of the image sensors may be provided by different vendors, which may result in multiple different drivers. Further, each of the image sensors manufactured by the different vendors may additionally have different application programming interfaces (APIs), which are used to expose certain features and/or settings of the image sensors to the user via a software application. Accordingly, for a software application to interface with the image sensor array 116 in a typical computing device, the software application may need to be designed to interface with a number of image sensor drivers and APIs.

To overcome such complexity that may be introduced by the multiple image sensor-specific drivers and APIs, the computing device 102 implements a single driver (see camera driver module 310 of FIG. 3) to restrict access to the individual image sensors. For example, the implemented single driver may "overlay" the multiple image sensor-specific drivers. As discussed in more detail below, the implemented single driver controls which data stream from the multiple image sensors is provided to a particular API, or user. In other words, the implemented single driver only exposes a single image sensor from the image sensor array to that particular API, or user. For example, in some embodiments, the exposed image sensor (e.g., the primary image sensor) may be the image sensor that supports the highest resolution; however, it should be appreciated that, in some embodiments, different criteria may be used to select the primary image sensor, such as available feature support, field of view (FOV), etc. As such, image data from the exposed image sensor (e.g., the primary image sensor) may be the only image data used for displaying image sensor data to the user, regardless of which camera mode the camera device is set to (e.g., preview an image, capture video, or capture a photo). To do so, the implemented single driver determines which image data from the available image sensors is delivered to the user and hides certain calculations performed on the image data. In some embodiments, the implemented single driver may perform such determinations based on the present camera mode. Additionally, the implemented single driver may perform certain calculations (e.g., image depth calculations) outside of the API. In some embodiments, performing the calculations outside of the API may reduce reliance on the individual APIs.

The computing device 102 may be embodied as any type of device capable of image sensor management and otherwise performing the functions described herein. For example, the computing device 102 may be embodied as, without limitation, a digital camera, a smartphone, a table computer, a laptop computer, a notebook computer, a wearable computing device, a computer, a workstation, a server, a multiprocessor system, a consumer electronic device, a smart appliance, and/or any other computing device capable of image sensor management. As shown in FIG. 1, the illustrative computing device 102 includes the processor 104, the I/O subsystem 106, the memory 108, and the data storage device 112, among other previously noted components. Of course, in other embodiments, the computing device 102 may include other or additional components, such as those commonly found in a computing device (e.g., smartphone, laptop, digital camera, etc.) that includes a camera feature (e.g., various input/output devices). Additionally, in some embodiments, one or more of the illustrative components may be incorporated in, or otherwise form a portion of, another component. For example, the memory 108, or portions thereof, may be incorporated in one or more processors 104 in some embodiments.

The processor 104 may be embodied as any type of processor capable of performing the functions described herein. The processor 104 may be embodied as a single or multi-core processor(s), digital signal processor, microcontroller, or other processor or processing/controlling circuit. The memory 108 may be embodied as any type of volatile or non-volatile memory or data storage capable of performing the functions described herein. In operation, the memory 108 may store various data and software used during operation of the computing device 102 such as operating systems, applications, programs, libraries, and drivers. For example, in the illustrative computing device 102, the memory 108 includes a camera driver 110 configured to interface with the camera device 114. The memory 108 is communicatively coupled to the processor 104 via the I/O subsystem 106, which may be embodied as circuitry and/or components to facilitate input/output operations with the processor 104, the memory 108, and other components of the computing device 102. For example, the I/O subsystem 106 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processors 104, the memory 108, and other components of the computing device 102, on a single integrated circuit chip.

The data storage device 112 may be embodied as any type of device or devices configured for short-term or long-term storage of data such as, for example, memory devices and circuits, memory cards, hard disk drives, solid-state drives, or other data storage devices. In some embodiments, the data storage device 112 may be used to store the contents of one or more trusted execution environments. When stored by the data storage device 112, the contents of the trusted execution environments may be encrypted to prevent access by unauthorized software.

Figure 2:
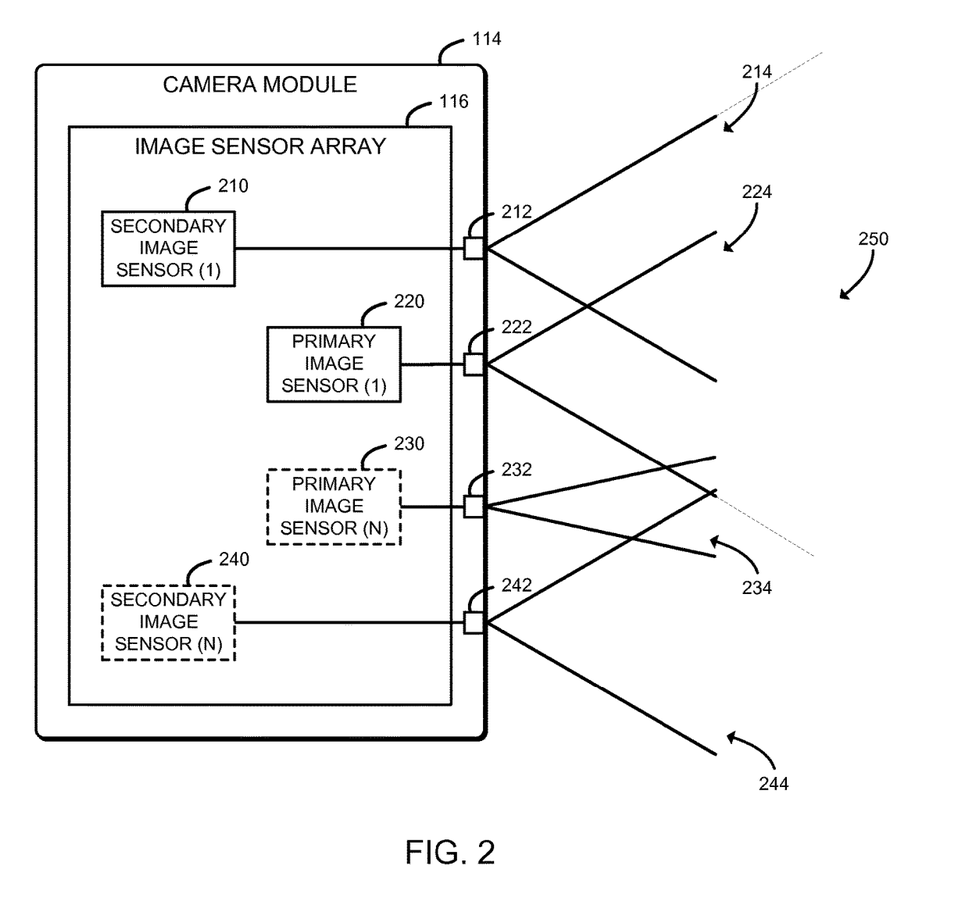
FIG. 2 is a simplified block diagram of at least one embodiment of the camera of the computing device of FIG. 1.

The camera device 114 may be embodied as any type of image capturing device, circuit, or a combination thereof capable of enabling images to be captured, transmitted into signals, and processed into still photographs and/or digital videos. The camera device 114 may be configured to use any image formatting technologies for capturing raw image data and storing the raw data as compressed and/or uncompressed still photograph files and/or video files using various digital format technologies and containers to a file on the computing device (e.g., the data storage 112). The illustrative camera device 114 includes an image sensor array 116. As shown in FIG. 2 and described in further detail below, the image sensor array 116 may include multiple image sensors, each of which may be capable of capturing light and converting the captured light into electrical signals to be processed into photographs and/or videos. In some embodiments, the image sensor array 116 may be embodied as or otherwise include one more charge-coupled device (CCD) image sensors, complementary metal-oxide-semiconductor (CMOS) image sensors, and/or any type of image sensor capable of performing the functions described herein. Additionally, in some embodiments, the image sensor array 116 may include image sensors having various different image sensor formats (i.e., shape and size). As described above, the computing device 102 may use the camera driver 110 as a means to interface between the processor 104 and the camera device 114, for executing certain functions of the camera device 114. Additionally, in some embodiments, the camera device 114 may provide an interface (e.g., via an application programming interface (API)) between user facing software of the camera device 114 (i.e., a user) and the camera driver 110 to implement user requested settings for the camera device 114, such as enabling and disabling certain of the image sensors of the image sensor array 116, for example.

The communication circuitry 118 may be embodied as any communication circuit, device, or collection thereof, capable of enabling communications between the computing device 102 and a remote computing device (not shown). The communication circuitry 118 may be configured to use any one or more communication technologies (e.g., wired or wireless communications) and associated protocols (e.g., Ethernet, Bluetooth®, Wi-Fi®, WiMAX, USB, etc.) to effect such communication.

The display 120 may be embodied as any type of display device capable of displaying digital information such as a liquid crystal display (LCD), a plasma display, a light emitting diode (LED), a cathode ray tube (CRT), or other type of display device. In such embodiments, the display may be embodied as a touch screen (e.g., a resistive touch screen, a capacitive touch screen, or the like) capable of generating input data in response to being touched by a user of the computing device 102.

Referring now to FIG. 2, the illustrative image sensor array 116 of the camera device 114 includes multiple image sensors configured to capture an optical image and convert the captured optical image into electrical signals. The illustrative image sensor array 116 includes a first secondary image sensor, a first primary image sensor, a second primary image sensor, and a second secondary image sensor, which are designated as secondary image sensor (1) 210, primary image sensor (1) 220, primary image sensor (N) 230 (i.e., the "Nth" primary image sensor, wherein "N" is a positive integer and designates one or more additional primary image sensors), and secondary image sensor (N) 240 (i.e., the "Nth" secondary image sensor, wherein "N" is a positive integer and designates one or more additional secondary image sensors), respectively. Each of the image sensors 210, 220, 230, 240 may be embodied as any type of image sensor capable of performing the functions described herein, such as a charge-coupled device (CCD) image sensor, a complementary metal-oxide-semiconductor (CMOS) image sensor, and the like.

Typically, the image sensor array 116 includes at least one image sensor designated as the "primary" image sensor (e.g., the primary image sensor (1) 220). However, it should be appreciated that, in some embodiments, the image sensor array 116 may include more than one image sensor designated as a "primary" image sensor, only one of the "primary" image sensors may be exposed. In such embodiments, there may be one or more secondary image sensors, or none at all. In other embodiments, the image sensor array may include a single "primary" image sensor (e.g., the primary image sensor (1) 220) and one or more secondary image sensors. The primary image sensor (1) 220 (i.e., the only primary image sensor, or a designated one of the primary image sensors) may be designated as such based on certain properties that may create a more desirable image, such as a higher resolution capacity, little or no viewing angle offset from center, a narrow FOV, a broad FOV, a monochrome image sensor, an exposure time, etc.

In some embodiments, the camera device 114 may rely on one or more of the image sensors 210, 220, 230, 240 to calculate a depth for the optical image being captured and/or to create a wider FOV. For example, each of the image sensors 210, 220, 230, 240 may include an aperture that can capture a particular viewing angle, which the camera device 114 may interpret and process to generate a single image having a wider FOV than any single image sensor could produce alone. The illustrative camera device 114 includes a first aperture 212 connected to the secondary image sensor (1) 210, a second aperture 222 connected to the primary image sensor (1) 220, a third aperture 232 connected to the primary image sensor (N) 230, and a fourth aperture 242 connected to the second image sensor (N) 240. Accordingly, each aperture 212, 222, 232, 242 has an associated FOV. For example, the first image sensor 210 has a first FOV 214 through the first aperture 212, the primary image sensor (1) 220 has a second FOV 224 through the second aperture 222, the primary image sensor (N) 230 has a third FOV 234 through the third aperture 232, and the secondary image sensor (N) 240 has a fourth FOV 244 through the fourth aperture 242.

In some embodiments, the camera device 114 may take advantage of the different FOVs 214, 224, 234, 244 associated with the different image sensors 210, 220, 230, 240. For example, in an embodiment wherein the image sensor array 116 includes two primary image sensors (e.g., the primary image sensor (1) 220 and the primary image sensor (N) 230), a first primary image sensor may have a narrow focal length that can be used to zoom in and a second primary image sensor may have a broader focal length that the first primary image sensor that can be used to zoom out.

Similarly, each of the secondary image sensors may have properties or characteristics different from the primary image sensor and/or each other, such as a lower resolution or a greater viewing angle than the "primary" image sensor. For example, in an embodiment wherein the image sensor array 116 includes the primary image sensor (1) 220 and at least one secondary image sensor (e.g., the secondary image sensor (1) 210 and/or the secondary image sensor (N) 240), captured image data from the primary image sensor (1) 220 may be capable of capturing image data at the highest resolution of the available image sensors 210, 220, 230, 240, while captured image data from the one of secondary the image sensors (e.g., the secondary image sensor (1) 210) may be capable of capturing image data at a different, lower resolution. Accordingly, captured image data from the secondary image sensor (1) 210 may be used to calculate depth for the optical image being captured, while the captured image data from the primary image sensor (1) 220 is exposed to a user via a display (e.g., the display 120 of the computing device 102 of FIG. 1). Additionally or alternatively, in such embodiments, the camera device 114 may use the captured image data from the primary image sensor (1) 220 and one or more of the secondary image sensors 210, 240 to create a wider FOV. For example, the second FOV 224 of the primary image sensor (1) 220 may be combined with the first FOV 214 of the secondary image sensor (1) 210 to create a widened FOV 250 that extends to the outermost bounds of each of the first and second FOVs 214, 224. It should be appreciated that, in such embodiments, one or more settings of the primary image sensor (1) 220 may be exposed to a user of the computing device 102, while the secondary image sensors 210, 240 may be positioned at such angles within the image sensor array 116 such that their respective FOVs 214, 234 can expand the primary FOV 224 of the primary image sensor (1) 220, without explicit settings of the secondary image sensors 210, 240 being exposed to the user.

While image sensor vendors (i.e., independent hardware vendors (IHVs)) may distribute user interfacing applications to take advantage of the features and functionality of their image sensors, the image sensor vendors typically release an API, which typically allow a user interfacing software application (i.e., a camera application to apply filters and/or effects) to interface with the image sensors. In other words, the API allows a third party software vendor (i.e., an independent software vendor (ISV)) to access certain functionality (e.g., preview an image, capture a photo stream, capture a video stream, etc.), based on image data provided by the image sensors. In some embodiments, to support certain functionality, the image sensor vendors may additionally release a software development kit (SDK) as an alternative to accessing the API for certain functionality, such as performing a depth calculation or other computational photography features. In an embodiment that includes a number of image sensors produced by a number of different vendors, the set of APIs and/or SDKs with which the user interfacing software application may need to interface can become complex, especially for a novice user.

Figure 3:
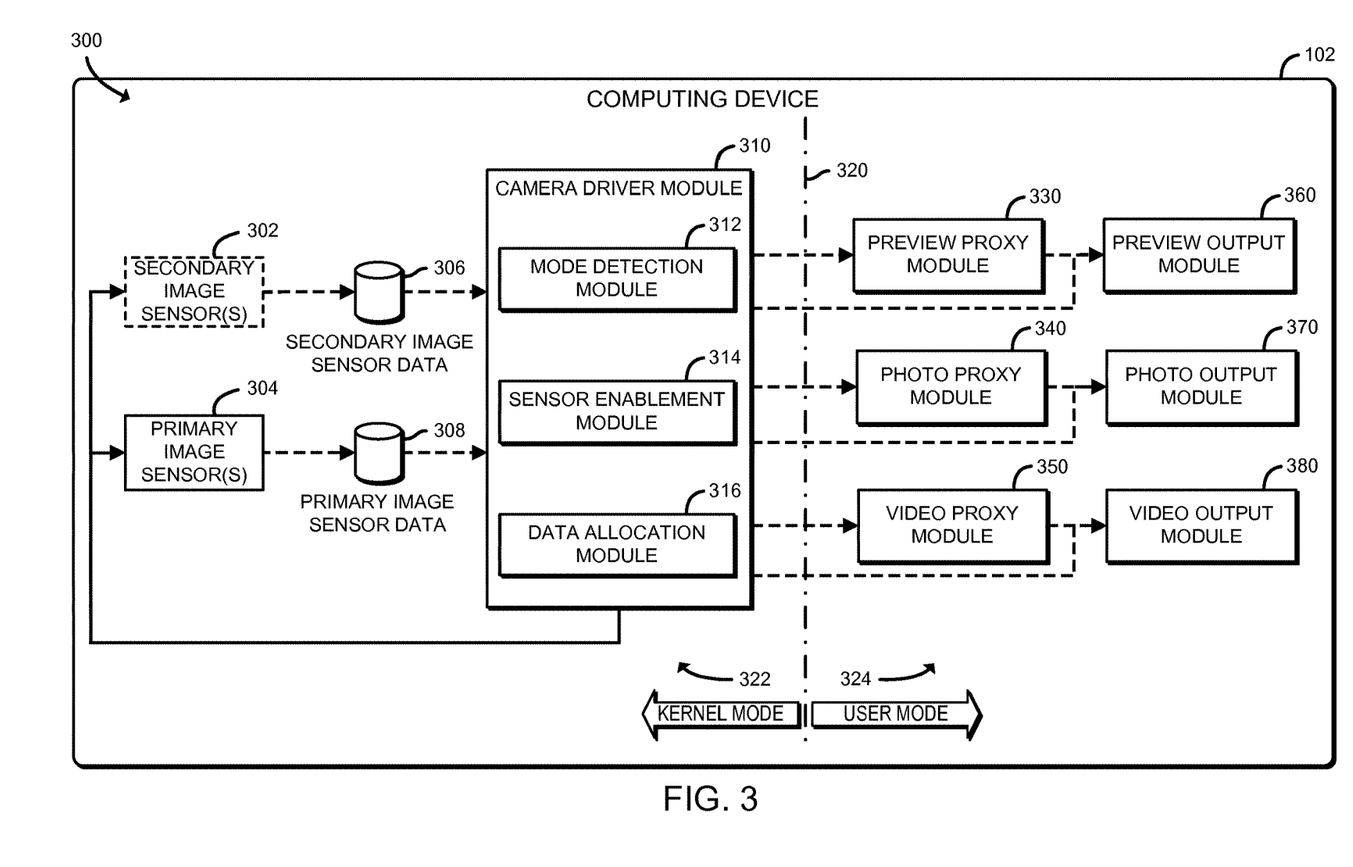
FIG. 3 is a simplified block diagram of at least one embodiment of an environment of the computing device of FIG. 1.

Referring now to FIG. 3, the computing device 102 may establish an environment 300 during operation. In the illustrative environment 300, the computing device 102 includes a camera driver module 310, a preview proxy module 330, a photo proxy module 340, a video proxy module 350, a preview output module 360, a photo output module 370, and a video output module 380. The various modules of the environment 300 may be embodied as hardware, firmware, software, or a combination thereof. For example, the various modules, logic, and other components of the environment 300 may form a portion of, or otherwise be established by, the processor 104 or other hardware components of the computing device 102. As such, in some embodiments, any one or more of the modules of the environment 300 may be embodied as a circuit or collection of electrical devices (e.g., a camera driver circuit, a photo capture circuit, a video capture circuit, etc.). Additionally or alternatively, in some embodiments, one or more of the illustrative modules may form a portion of another module and/or one or more of the illustrative modules and/or submodules may be embodied as a standalone or independent module.

The illustrative environment 300 additionally includes one or more secondary image sensors 302 (e.g., the secondary image sensor (1) 210 and/or the secondary image sensor (N) 240) and one or more primary image sensors 304 (e.g., the primary image sensor (1) 220 and/or the primary image sensor (N) 230). As described previously, in some embodiments, the computing device 102 may include one primary image sensor and one or more secondary sensors. In other embodiments, the computing device 102 may include more than one primary image sensor and one or more secondary image sensors. Further, in some embodiments, the computing device 102 may include more than one primary image sensor and no secondary image sensors. The illustrative environment 300 further includes primary image sensor data 306 and primary image sensor data 308.

In some embodiments, optical image data from the secondary image sensor(s) 302 may be stored in the secondary image sensor data 306 and optical image data from the primary image sensor(s) 304 may be stored in the primary image sensor data 308. The image sensor data 306, 308 from the secondary and primary image sensors 302, 304 may be accessed by one or more of the modules of the environment 300. A demarcation line 318 delineates between a kernel mode 322 portion of the embodiment 300 that includes the secondary and primary image sensors 302, 304 and the camera driver module 310, and a user mode 324 of the embodiment 300 that includes the proxy modules 330, 340, 350 and the output modules 360, 370, 380.

The camera driver module 310 is configured to manage which image sensor data 306, 308 from of the respective secondary and primary image sensors 302, 304 may be output for preview (i.e., streamed to a display) and/or capture (i.e., saved to a file). The camera driver module 310 may only expose a single image sensor (e.g., the primary image sensor (1) 220 of FIG. 2) from the image sensor array 116 to the user, regardless of which mode (e.g., preview, video, or photo) into which the user has placed the camera device 114. In other words, unlike conventional computing devices with camera features wherein a user can manage each image sensor to dictate which image sensor(s) are enabled, the computing device 102 implements the camera driver module 310 to decide which optical image data is presented to the user.

As described above, each of the secondary and primary image sensors 302, 304 includes an API for exposing certain functionality of the corresponding image sensors 302, 304. Accordingly, settings of each the image sensors 302, 304 are typically displayed to the user based on what access to certain functionality has been exposed via the APIs. However, as also described above, the number of APIs may increase with each image sensor added to the image sensor array 116 and may expose any number of settings to the user, including enabling and disabling of the image sensors 302, 304. Additionally, the user may not be able to discern differences between the image sensors 302, 304 (e.g., resolution, viewing angles, etc.) and/or the settings thereof. As a result, the user may inadvertently capture photos or videos with a lower resolution image sensor or at a less than optimal angle than the user intended. As such, the camera driver module 310 only exposes a single image sensor (e.g., the primary image sensor (1) 220) to the user to avoid such confusion.

To only expose the single image sensor, the camera driver module 310 may restrict user access to the other image sensors (e.g., the secondary image sensors) from the users. In some embodiments, to do so, the camera driver module 310 may hide the settings of the other image sensors from the user. For example, in an embodiment in which the secondary image sensors 302 are used for depth calculation, the primary image sensor (1) 220 may be the only image sensor exposed to the user. Accordingly, the depth calculation may be performed hidden from the APIs, but automatically executed and inserted as metadata into a photo (e.g., a jpeg image) on a still photo capture request from the user. In another example, the optical image data from each of the image sensors 302, 304 may be combined into a single stream with capabilities based on the user defined settings (e.g., digital zoom, fast frame rate, etc.) at an image quality determined to be the highest available image quality by the camera driver module 310.

The illustrative camera driver module 310 includes a mode determination module 312, a sensor enablement module 314, and a data allocation module 316. The mode determination module 312 is configured to determine a camera mode setting and a user input mode setting. In the illustrative embodiment, the available camera mode settings include a preview mode, a photo capture mode, and/or a video capture mode. Of course, in other embodiments, the available camera mode settings may include additional or other camera modes. Additionally, in some embodiments, the user input mode setting may include a normal mode, a depth detect mode, a near-optical zoom mode, a fast frame rate mode, and/or any other mode or capability as supported by the camera driver module 310. The camera mode setting and/or the user input mode setting may be set by any user input means that allows the user to switch between modes, such as a hardware input (e.g., a sliding button) or a software input (e.g., a user interfacing software selector soft-key) of the computing device 102. The sensor enablement module 314 is configured to set the state of each of the image sensors 302, 304 to enabled, or disabled, according to the camera mode setting and/or the user input mode setting. Similarly, the data allocation module 316 is configured to output (i.e., transmit) the optical image data based on the camera mode setting and/or the user input mode setting.

The user mode 324 is comprised of the proxy modules 330, 340, 350 and the output modules 360, 370, 370. The proxy modules 330, 340, 350 are configured to provide an interface in which to broker each stream of optical image data between the camera driver module 310 in the kernel mode 322 and the output modules 360, 370, 370 of the user mode 324. In some embodiments, proxy modules 330, 340, 350 may receive streams of the optical image data from the camera driver module 310 via the data allocation module 316, for example. In such embodiments, the proxy modules 330, 340, 350 may receive information corresponding to the optical image data streams, such as filter descriptors, for example.

The output modules 360, 370, 370 are configured to process (i.e., transform) the optical image data received from the proxy modules 330, 340, 350, store the optical image data, if applicable, and render the output for transmission to a display, such as the display 120 of FIG. 1. To do so, the output modules 360, 370, 370 may be embodied as any optical image data processor capable of encoding, decoding, and/or applying any other type of digital signal processing to the optical image data, including, but not limited to demultiplexing, multiplexing, scaling, converting, applying effects, interlacing, de-interlacing, and/or the like. For example, in an embodiment wherein resources of the computing device 102 are by managed by a Windows-based operating system, the output modules 360, 370, 370 may be embodied as Media Foundation Transforms (MFTs) or DirectX Media Objects (DMOs) capable of implementing transform models for processing the optical image data.

In a three-camera array embodiment wherein the image sensor array 116 includes a primary image sensor (e.g., the primary image sensor (1) 220) and two secondary image sensors (the secondary image sensors 210, 240), in the normal mode, the camera driver module 310 may capture optical image data from the primary image sensor (1) 220 only and as such, the data allocation module 316 may only deliver the optical image data captured from the primary image sensor (1) 220. In other words, the sensor enablement module 314 may enable the primary image sensor (1) 220 and disable the secondary image sensors 210, 240, if depth calculation is not required.

Further, in the depth detect mode, the sensor enablement module 314 may enable all of the image sensors 210, 220, 240, and allow the camera driver module 310 to capture the optical image data from all of the image sensors 210, 220, 240. However, the data allocation module 316 may only deliver optical image data (i.e., an image data stream) from the primary image sensor (1) 220 for preview and video data, while delivering optical image data from each of the image sensors 210, 220, 240 for photo data. In other words, if the user is viewing the optical image data in a preview mode, the data allocation module 316 may only deliver the optical image data from the primary image sensor (1) 220 to the preview proxy module 330.

Similarly, if the user is viewing the optical image data in a video capture mode, the data allocation module 316 may deliver the optical image data from the primary image sensor (1) 220 to the video proxy module 350. However, if the user is viewing the optical image data in photo capture mode, the data allocation module 316 may deliver the optical image data from the primary image sensor (1) 220 to the photo proxy module 340 and the optical image data from each of the secondary image sensors 210, 240 to the photo output module 370. Accordingly, the proxy modules 330, 340, 350 do not need to receive the optical image data from the secondary image sensors 210, 240 to perform computations, such as depth calculation, as the computations may be performed at the proxy modules 330, 340, 350 and the computation results inserted as metadata by the output modules 360, 370, 370. Further, when the user initiates a photo capture request with depth calculation, the necessary image sensors are already initialized, thereby reducing latency associated with initializing the secondary image sensors 210, 240.

Figure 4:
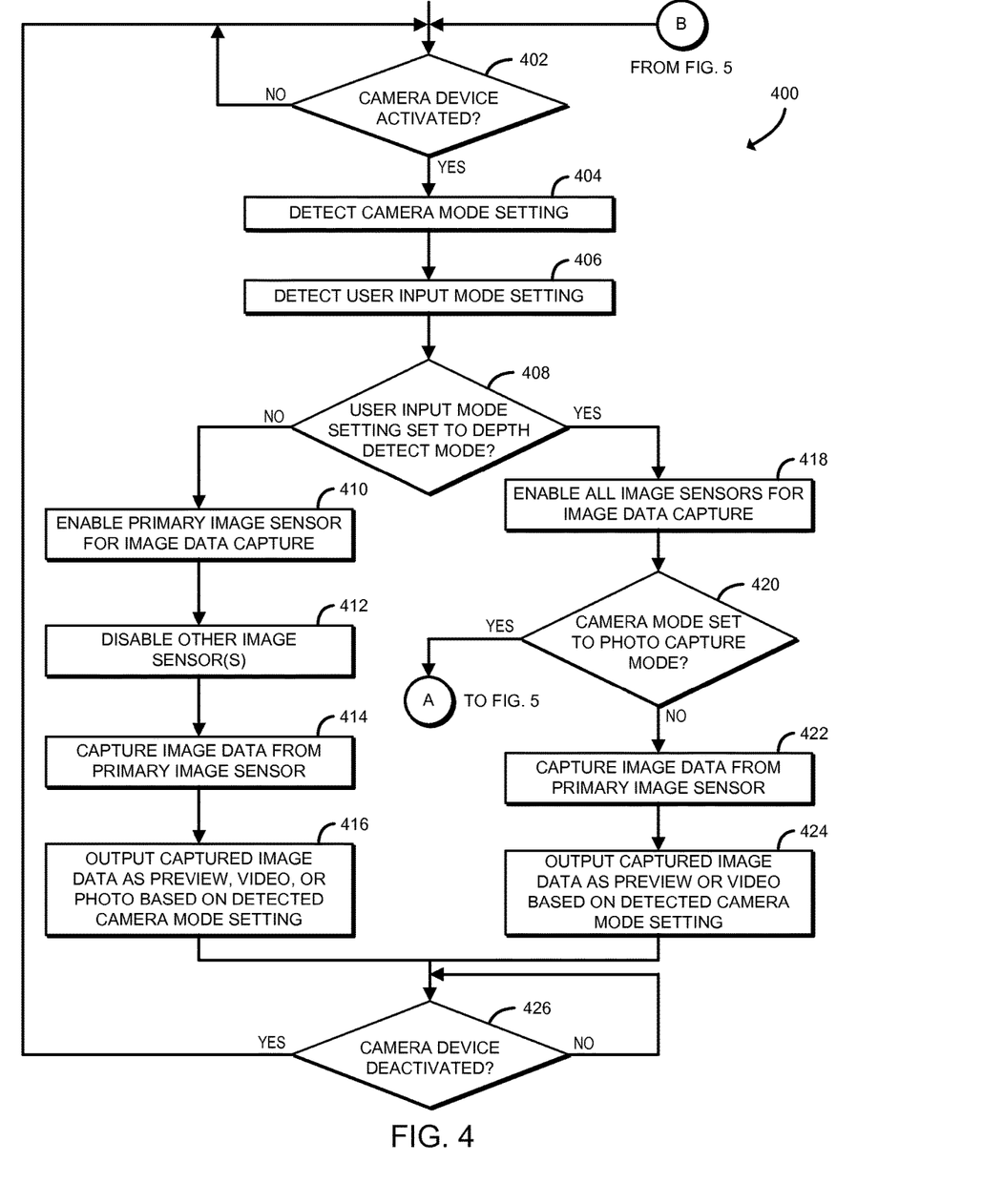
FIGS. 4 and 5 are a simplified flow diagram of at least one embodiment of a method for enabling image sensors for image data capture that may be executed by the computing device of FIG. 1.

Referring now to FIG. 4, in use, the camera device 114 of the computing device 102 may execute a method 400 for enabling image sensors for image data capture based on user-defined mode settings. As described above, at least a portion of the functionality executed by the camera device 114 may be performed by a single camera driver (e.g., the camera driver 110) for managing each of the image sensors. The illustrative method 400 begins at block 402, in which the camera device 114 determines whether it has been activated. In some embodiments, the camera device 114 may have been activated in response to an activation trigger, such as a power-on event of the computing device 102, a power-on event of the camera device 114 itself, or an external application presently being executed on the computing device 102 that awakens the camera device 114 from a suspended state.

If the camera device 114 has not been activated, the method 400 loops back to block 402 to continue to determine whether it has been activated and/or until an activation trigger is received. If the camera device 114 has been activated, the method 400 advances to block 404, in which the camera device 114 determines a camera mode setting. In some embodiments, the camera mode setting may be set to one of a preview mode, a video capture mode, and a photo capture mode. At block 406, the camera device 114 determines a user input mode setting. In some embodiments, the user input mode setting may be set to one of a depth detect mode or a normal mode.

At block 408, the camera device 114 determines whether the user input mode setting is set to depth detect mode. If not, the method 400 advances to block 410, wherein the camera device 114 enables an image sensor designated as a primary image sensor (e.g., the primary image sensor (1) 220 of FIG. 2) for image data capture. In other words, the camera device 114 sets the state of the primary image sensor (1) 220 to an enabled state. At block 412, the camera device 114 disables the other image sensors (e.g., the secondary image sensors 210, 240 of FIG. 2) in the image sensor array 116. At block 414 the camera device 114 captures the image data (i.e., the optical image data stream) from the primary image sensor (1) 220. At block 416, the camera driver 110 outputs the captured image data as a preview, a video, or a photo, based on the camera mode setting determined at block 404.

If the camera device 114 determines the user input mode setting is set to depth detect mode, the method 400 advances to block 418, wherein the camera device 114 enables all of the image sensors for image data capture. In other words, the camera device 114 sets the state of the primary image sensor (1) 220 and the secondary image sensors 210, 240 to an enabled state. At block 420, the camera device 114 determines whether the camera mode is set for photo capture based on the camera mode setting determined at block 404. If not, the method advances to block 422, wherein the camera device 114 captures image data from the primary image sensor (1) 220. At block 424, the camera device 114 outputs the captured image data as a preview or a video based on the camera mode setting determined at block 404. Upon outputting the captured image data as a preview, a video, or a photo at block 416, or outputting the captured image data as a preview or a video at block 424, the method 400 advances to block 426, wherein the camera device 114 determines whether it has been deactivated (i.e., capture/preview request stopped, a power-off event, etc.). If not, the method 400 continues to output the image data as appropriate and loops back to block 426 to determine whether the camera device 114 has been deactivated. If the camera device 114 determines it has been deactivated at block 426, the method 400 loops back to block 402 to determine whether the camera device 114 has been activated.

Figure 5:
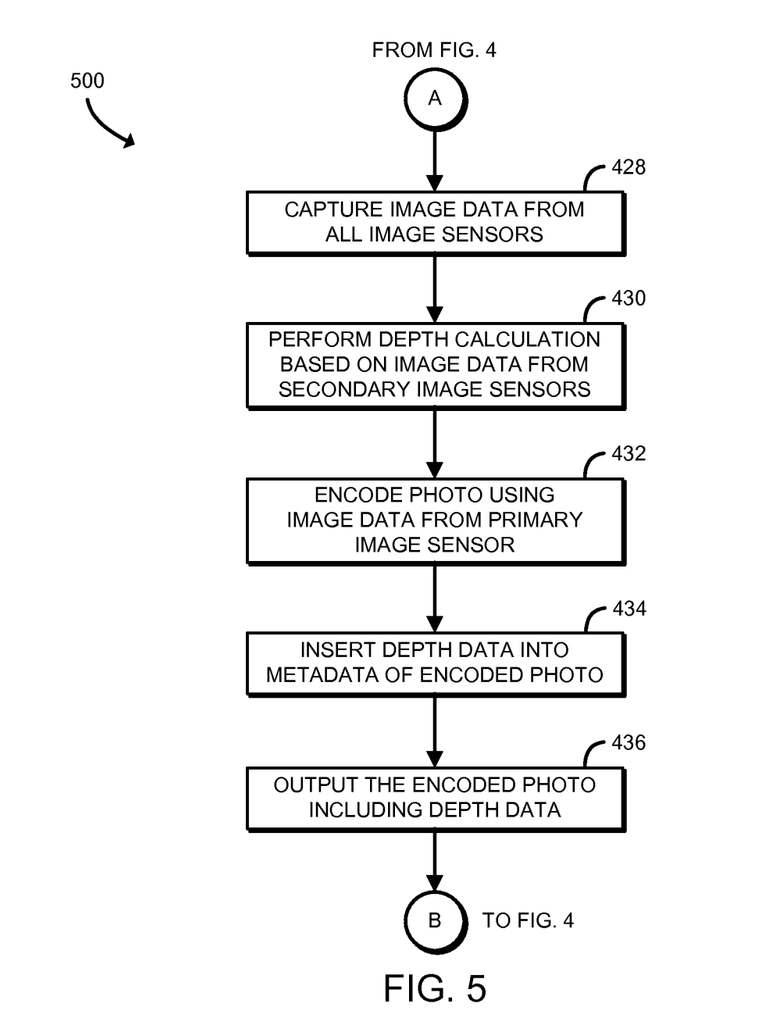

If the camera device 114 determines at block 420 that the camera mode is set for photo capture, the method proceeds to block 428, which is illustrated in FIG. 5. At block 428 the camera device 114 captures the image data from all the image sensors. In other words, the camera device 114 captures the image data from the primary image sensor (1) 220 and the secondary image sensors 210, 240. At block 430, the camera device 114 performs a depth calculation based on the image data from the secondary image sensors 210, 240. At block 432, the camera device 114 encodes the photo using the image data from the primary image sensor (1) 220. In some embodiments, the image data used for the depth calculation at block 430 and the encoding of the photo at block 432 is determined by the single driver that interfaces with each of the primary image sensors (e.g., the primary image sensor (1) 220 and the primary image sensor(s) (N) 230) and secondary image sensors (e.g., the secondary image sensor (1) 210 and the secondary image sensor(s) (N) 240). At block 434, the camera device 114 inserts the calculated depth data into metadata of the encoded photo. In some embodiments, each of the depth calculation at block 430, the encoding of the photo at block 432, and the metadata insertion of the calculated depth at block 434 may be performed by an output module, or transform module, (e.g., the output modules 360, 370, 380 of FIG. 3) of the computing device 102. At block 436, the camera device 114 outputs the encoded photo including the metadata with the inserted depth data before the method 400 loops back to block 402 to determine whether the camera device 114 is still activated.

EXAMPLES

Illustrative examples of the technologies disclosed herein are provided below. An embodiment of the technologies may include any one or more, and any combination of, the examples described below.

Example 1 includes a computing device for controlling user access to image sensors of an image sensor array, the computing device comprising a camera device that includes an image sensor array, wherein the image sensor array comprises a plurality of image sensors; and a camera driver module to (i) manage access to image data streams generated by each of the image sensors of the image sensor array, (ii) expose a single image sensor of the image sensor array to a user of the computing device, and (iii) restrict user access to other image sensors of the image sensor array other than the exposed single image sensor.

Example 2 includes the subject matter of Example 1, and wherein the plurality of image sensors comprises a primary image sensor and one or more secondary image sensors; wherein the camera driver module is further to (i) manage access to image data streams generated by the primary image sensor and the one or more secondary image sensors, (ii) expose the primary image sensor to the user of the computing device, and (iii) restrict user access to the one or more secondary image sensors of the image sensor array.

Example 3 includes the subject matter of any of Examples 1 and 2, and wherein the plurality of image sensors comprises one or more primary image sensors; wherein the camera driver module is further to (i) manage access to image data streams generated by each of the primary image sensors, (ii) expose a single primary image sensor to the user of the computing device, and (iii) restrict user access to other primary image sensors of the primary image sensors other than the single primary image sensor.

Example 4 includes the subject matter of any of Examples 1-3, and wherein the plurality of image sensors additionally comprises one or more secondary image sensors; wherein the camera driver module is further to (i) manage access to image data streams generated by the one or more secondary image sensors and (ii) restrict user access to the one or more secondary image sensors.

Example 5 includes the subject matter of any of Examples 1-4, and wherein the camera driver module is further to select the primary image sensor from a plurality of image sensors of the image sensor array based on one or more predetermined criterion.

Example 6 includes the subject matter of any of Examples 1-5, and wherein the one or more predetermined criterion comprises at least one of a supported resolution, a field of view, or a viewing angle.

Example 7 includes the subject matter of any of Examples 1-6, and wherein to manage access to the image data streams from the image sensors of the image sensor array comprises to manage whether the image sensors of the image sensor array are enabled.

Example 8 includes the subject matter of any of Examples 1-7, and wherein to manage access to image data streams from the image sensors of the image sensor array comprises to manage the image data stream of the single image sensor at a kernel mode of the computing device to a first set of components accessible at a user mode of the computing device and to manage the image data stream of the other image sensors of the image sensor array at the kernel mode of the computing device to a second set of components accessible at the user mode of the computing device.

Example 9 includes the subject matter of any of Examples 1-8, and wherein the second set of the user mode components comprises one or more media transform modules to process received image sensor data and output the processed image sensor data based on a camera mode setting of the camera device, and wherein the first set of components accessible at the user mode comprises one or more media stream device proxy modules to broker streams of optical image data from the camera driver module to a corresponding one of the one or more media transform modules.

Example 10 includes the subject matter of any of Examples 1-9, and wherein to expose the single image sensor comprises to expose an image data stream from the single image sensor to a software application capable of being executed by the computing device.

Example 11 includes the subject matter of any of Examples 1-10, and wherein to expose the single image sensor comprises to expose one or more settings of the single image sensor to a user of the computing device.

Example 12 includes the subject matter of any of Examples 1-11, and further including a plurality of output modules to process received image sensor data and output the processed image sensor data based on a camera mode setting of the camera device; a plurality of proxy modules to broker each stream of optical image data from the camera driver module to a corresponding one of the plurality of output modules; wherein the camera driver module is further to (i) determine the camera mode setting and a user input mode setting of the camera device, (ii) manage an enabled state of each of the single image sensor and the other image sensors of the image sensor array based at least in part on the user input mode setting, and (iii) transmit image sensor data to one of the plurality of proxy modules based on the camera mode setting.

Example 13 includes the subject matter of any of Examples 1-12, and wherein the camera driver module is further to, in response to a determination that the user input mode is set to a depth detect mode, (i) enable the single image sensor for image sensor data capture, (ii) disable the other image sensors of the image sensor array, and (iii) transmit image sensor data from the single image sensor to one of the plurality of proxy modules based on the camera mode setting.

Example 14 includes the subject matter of any of Examples 1-13, and wherein the camera driver module is further to, in response to a determination that the camera mode setting is not set to a depth detect mode, (i) enable the single image sensor and the other image sensors of the image sensor array for image sensor data capture and (ii) determine whether the camera device is set for photo capture.

Example 15 includes the subject matter of any of Examples 1-14, and wherein the plurality of output modules comprises a preview output module to process the received image sensor data and output a preview image based on the processed image sensor data, and a video output module to process the received image sensor data and output a video based on the processed image sensor data, the plurality of proxy modules comprises a preview proxy module to broker the optical image data between the camera driver module and the preview output module, and a video proxy module to broker the optical image data between the camera driver module and the video output module, and the camera driver module is further to, in response to a determination that the camera mode is not set to a photo capture mode, (i) capture image sensor data from the single image sensor and (ii) transmit image sensor data from the single image sensor to one of the preview proxy module or the video proxy module.

Example 16 includes the subject matter of any of Examples 1-15, and wherein the plurality of output modules further comprises a photo output module to process received image sensor data and output a photo based on the received image sensor data, the plurality of proxy modules further comprises a photo proxy module to broker the optical image data between the camera driver module and the photo output module, the camera driver module is further to, in response to a determination that the camera mode is set to a photo capture mode, (i) capture image sensor data from the single image sensor and the other image sensors of the image sensor array, and (ii) transmit image sensor data from the single image sensor to one of the preview proxy module or the video proxy module based at least in part on the camera mode setting, and the photo proxy module is further to (i) encode a photo using the image sensor data from the single image sensor, (ii) calculate depth data based on the image sensor data from one or more of the other image sensors of the image sensor array, (iii) insert the depth data into metadata of the encoded photo, and (iv) output the photo including the depth data.

Example 17 includes the subject matter of any of Examples 1-16, and wherein to broker the optical image data between the camera driver module and the preview output module comprises to transmit received image sensor data from the camera driver module to the preview output module.

Example 18 includes the subject matter of any of Examples 1-17, and wherein to broker the optical image data between the camera driver module and the video output module comprises to transmit received image sensor data from the camera driver module to the video output module.

Example 19 includes the subject matter of any of Examples 1-18, and wherein to broker the optical image data between the camera driver module and the photo output module comprises to transmit received image sensor data from the camera driver module to the photo output module.

Example 20 includes a method for controlling user access to image sensors of an image sensor array of a computing device, the method comprising generating image data streams by each of a plurality of image sensors of an image sensor array of the computing device; managing, by a camera driver module of the computing device, access to the generated image data streams; exposing, by the camera driver module, a single image sensor to a user of the computing device; and restricting user access to other image sensors of the image sensor array other than the exposed single image sensor.

Example 21 includes the subject matter of Example 20, and wherein generating the image data streams by each of the plurality of image sensors of the image sensor array of the computing device comprises generating the image data streams by each of a primary image sensor and one or more secondary image sensors; wherein exposing the single image sensor to the user of the computing device comprises exposing the primary image sensor to the user of the computing device; and wherein restricting user access to the other image sensors of the image sensor array other than the exposed single image sensor comprises restricting user access to the one or more secondary image sensors of the image sensor array.

Example 22 includes the subject matter of any of Examples 20 and 21, and wherein generating the image data streams by each of the plurality of image sensors of the image sensor array of the computing device comprises generating the image data streams by each of a plurality of primary image sensors; wherein exposing the single image sensor to the user of the computing device comprises exposing a single primary image sensor of the plurality of primary image sensors to the user of the computing device; and wherein restricting user access to the other image sensors of the image sensor array other than the exposed single image sensor comprises restricting user access to other primary image sensors of the plurality of primary image sensors other than the single primary image sensor.

Example 23 includes the subject matter of any of Examples 20-22, and wherein generating the image data streams by each of the plurality of image sensors of the image sensor array of the computing device further comprises generating the image data streams by each of one or more secondary image sensors; and wherein restricting user access to the other image sensors of the image sensor array other than the single image sensor comprises restricting user access to the one or more secondary image sensors.

Example 24 includes the subject matter of any of Examples 20-23, and further including selecting, by the camera driver module, the single primary image sensor from the plurality of primary image sensors based on one or more predetermined criterion.

Example 25 includes the subject matter of any of Examples 20-24, and wherein selecting the single primary image sensor from the one or more predetermined criterion comprises selecting the single primary image sensor based on at least one of a supported resolution, a field of view, or a viewing angle.

Example 26 includes the subject matter of any of Examples 20-25, and wherein managing access to the image data streams from the image sensors comprises managing whether the image sensors are enabled.

Example 27 includes the subject matter of any of Examples 20-26, and wherein managing access to image data streams from the image sensors comprises (i) managing the image data stream of the single image sensor at a kernel mode of the computing device to a first set of components accessible at a user mode of the computing device and (ii) managing the image data stream of the other image sensors of the image sensor array at the kernel mode of the computing device to a second set of components accessible at the user mode of the computing device.

Example 28 includes the subject matter of any of Examples 20-27, and wherein managing the image data stream of the other image sensors of the image sensor array at the kernel mode of the computing device to the second set of components comprises managing the image data stream of the other image sensors of the image sensor array at the kernel mode of the computing device to one or more media transform modules to process received image sensor data and output the processed image sensor data based on a camera mode setting of the computing device, and wherein managing the image data stream of the single image sensor at a kernel mode of the computing device to a first set of components comprises managing the image data stream of the single image sensor at a kernel mode of the computing device to one or more media stream device proxy modules for brokering streams of optical image data from the camera driver module to a corresponding one of the one or more media transform modules.

Example 29 includes the subject matter of any of Examples 20-28, and wherein exposing the single image sensor comprises exposing an image data stream from the single image sensor to a software application capable of being executed by the computing device.

Example 30 includes the subject matter of any of Examples 20-29, and wherein exposing the single image sensor comprises exposing one or more settings of the single image sensor to a user of the computing device.

Example 31 includes the subject matter of any of Examples 20-30, and further including determining a camera mode setting and a user input mode setting of the computing device; managing an enabled state of each of the image sensors based at least in part on the user input mode setting; transmitting, by the camera driver module, image sensor data to one of a plurality of proxy modules based on the camera mode setting; brokering, by at least one of the plurality of proxy modules, each stream of optical image data from the camera driver module to a corresponding one of the plurality of output modules; processing, by at least one of the plurality of output modules, received image sensor data based at least in part on the camera mode setting of the computing device; and outputting the processed image sensor data to a display of the computing device.

Example 32 includes the subject matter of any of Examples 20-31, and further including, in response to a determination that the user input mode is set to a depth detect mode enabling the single image sensor for image sensor data capture; disabling the other image sensors of the image sensor array; and transmitting image sensor data from the single image sensor to one of the plurality of proxy modules based on the camera mode setting.

Example 33 includes the subject matter of any of Examples 20-32, and further including, in response to a determination that the camera mode setting is not set to a depth detect mode enabling the single image sensor and the other image sensors of the image sensor array for image sensor data capture; and determining whether the computing device is set for photo capture.

Example 34 includes the subject matter of any of Examples 20-33, and wherein brokering each stream of optical image data from the camera driver module to a corresponding one of the plurality of output modules comprises brokering, by a preview proxy module, a stream of optical image data from the camera driver module to a preview output module to process the received image sensor data and output a preview image based on the processed image sensor data brokering, by a video proxy module, a stream of optical image data from the camera driver module to a video output module to process the received image sensor data and output a video based on the processed image sensor data brokering, by a photo proxy module, a stream of optical image data from the camera driver module to a photo output module to process the received image sensor data and output a photo based on the processed image sensor data Example 35 includes the subject matter of any of Examples 20-34, and further including, in response to a determination that the camera mode is not set to a photo capture mode capturing image sensor data from the single image sensor; and transmitting image sensor data from the single image sensor to one of the preview proxy module or the video proxy module.

Example 36 includes the subject matter of any of Examples 20-35, and further including, in response to a determination that the camera mode is set to a photo capture mode capturing image sensor data from the single image sensor and the other image sensors of the image sensor array; transmitting image sensor data from the single image sensor to one of the preview proxy module or the video proxy module based at least in part on the camera mode setting; encoding a photo using the image sensor data from the single image sensor; calculating depth data based on the image sensor data from one or more of the other image sensors of the image sensor array; inserting the depth data into metadata of the encoded photo; and outputting the photo including the depth data.

Example 37 includes the subject matter of any of Examples 20-36, and wherein brokering the optical image data between the camera driver module and the preview output module comprises transmitting received image sensor data from the camera driver module to the preview output module.

Example 38 includes the subject matter of any of Examples 20-37, and wherein brokering the optical image data between the camera driver module and the video output module comprises transmitting received image sensor data from the camera driver module to the video output module.

Example 39 includes the subject matter of any of Examples 20-38, and wherein brokering the optical image data between the camera driver module and the photo output module comprises transmitting received image sensor data from the camera driver module to the photo output module.

Example 40 includes a computing device comprising a processor; and a memory having stored therein a plurality of instructions that when executed by the processor cause the computing device to perform the method of any of Examples 20-39.

Example 41 includes one or more machine readable storage media comprising a plurality of instructions stored thereon that in response to being executed result in a computing device performing the method of any of Examples 20-39.

Example 42 includes a computing device for controlling user access to image sensors of an image sensor array, the computing device comprising means for generating image data streams by each of a plurality of image sensors of an image sensor array of the computing device; means for managing, by a camera driver module of the computing device, access to the generated image data streams; means for exposing, by the camera driver module, a single image sensor to a user of the computing device; and means for restricting user access to other image sensors of the image sensor array other than the exposed single image sensor.

Example 43 includes the subject matter of Example 42, and wherein the means for generating the image data streams by each of the plurality of image sensors of the image sensor array of the computing device comprises means for generating the image data streams by each of a primary image sensor and one or more secondary image sensors; wherein the means for exposing the single image sensor to the user of the computing device comprises means for exposing the primary image sensor to the user of the computing device; and wherein the means for restricting user access to the other image sensors of the image sensor array other than the exposed single image sensor comprises means for restricting user access to the one or more secondary image sensors of the image sensor array.

Example 44 includes the subject matter of any of Examples 42 and 43, and wherein the means for generating the image data streams by each of the plurality of image sensors of the image sensor array of the computing device comprises means for generating the image data streams by each of a plurality of primary image sensors; wherein the means for exposing the single image sensor to the user of the computing device comprises means for exposing a single primary image sensor of the plurality of primary image sensors to the user of the computing device; and wherein the means for restricting user access to the other image sensors of the image sensor array other than the exposed single image sensor comprises means for restricting user access to other primary image sensors of the plurality of primary image sensors other than the single primary image sensor.

Example 45 includes the subject matter of any of Examples 42-44, and wherein the means for generating the image data streams by each of the plurality of image sensors of the image sensor array of the computing device further comprises means for generating the image data streams by each of one or more secondary image sensors; and wherein the means for restricting user access to the other image sensors of the image sensor array other than the single image sensor comprises means for restricting user access to the one or more secondary image sensors.

Example 46 includes the subject matter of any of Examples 42-45, and further including means for selecting, by the camera driver module, the single primary image sensor from the plurality of primary image sensors based on one or more predetermined criterion.

Example 47 includes the subject matter of any of Examples 42-46, and wherein the means for selecting the single primary image sensor from the one or more predetermined criterion comprises means for selecting the single primary image sensor based on at least one of a supported resolution, a field of view, or a viewing angle.

Example 48 includes the subject matter of any of Examples 42-47, and wherein the means for managing access to the image data streams from the image sensors comprises means for managing whether the image sensors are enabled.

Example 49 includes the subject matter of any of Examples 42-48, and wherein the means for managing access to image data streams from the image sensors comprises (i) means for managing the image data stream of the single image sensor at a kernel mode of the computing device to a first set of components accessible at a user mode of the computing device and (ii) means for managing the image data stream of the other image sensors of the image sensor array at the kernel mode of the computing device to a second set of components accessible at the user mode of the computing device.

Example 50 includes the subject matter of any of Examples 42-49, and wherein the means for managing the image data stream of the other image sensors of the image sensor array at the kernel mode of the computing device to the second set of components comprises means for managing the image data stream of the other image sensors of the image sensor array at the kernel mode of the computing device to one or more media transform modules to process received image sensor data and output the processed image sensor data based on a camera mode setting of the computing device, and wherein the means for managing the image data stream of the single image sensor at a kernel mode of the computing device to a first set of components comprises means for managing the image data stream of the single image sensor at a kernel mode of the computing device to one or more media stream device proxy modules for brokering streams of optical image data from the camera driver module to a corresponding one of the one or more media transform modules.

Example 51 includes the subject matter of any of Examples 42-50, and wherein the means for exposing the single image sensor comprises means for exposing an image data stream from the single image sensor to a software application capable of being executed by the computing device.

Example 52 includes the subject matter of any of Examples 42-51, and wherein the means for exposing the single image sensor comprises means for exposing one or more settings of the single image sensor to a user of the computing device.

Example 53 includes the subject matter of any of Examples 42-52, and further including means for determining a camera mode setting and a user input mode setting of the computing device; means for managing an enabled state of each of the image sensors based at least in part on the user input mode setting; means for transmitting, by the camera driver module, image sensor data to one of a plurality of proxy modules based on the camera mode setting; means for brokering, by at least one of the plurality of proxy modules, each stream of optical image data from the camera driver module to a corresponding one of the plurality of output modules; means for processing, by at least one of the plurality of output modules, received image sensor data based at least in part on the camera mode setting of the computing device; and means for outputting the processed image sensor data to a display of the computing device.

Example 54 includes the subject matter of any of Examples 42-53, and further including, in response to a determination that the user input mode is set to a depth detect mode means for enabling the single image sensor for image sensor data capture; means for disabling the other image sensors of the image sensor array; and means for transmitting image sensor data from the single image sensor to one of the plurality of proxy modules based on the camera mode setting.

Example 55 includes the subject matter of any of Examples 42-54, and further including, in response to a determination that the camera mode setting is not set to a depth detect mode means for enabling the single image sensor and the other image sensors of the image sensor array for image sensor data capture; and means for determining whether the computing device is set for photo capture.

Example 56 includes the subject matter of any of Examples 42-55, and wherein the means for brokering each stream of optical image data from the camera driver module to a corresponding one of the plurality of output modules comprises means for brokering, by a preview proxy module, a stream of optical image data from the camera driver module to a preview output module to process the received image sensor data and output a preview image based on the processed image sensor data means for brokering, by a video proxy module, a stream of optical image data from the camera driver module to a video output module to process the received image sensor data and output a video based on the processed image sensor data means for brokering, by a photo proxy module, a stream of optical image data from the camera driver module to a photo output module to process the received image sensor data and output a photo based on the processed image sensor data Example 57 includes the subject matter of any of Examples 42-56, and further including, in response to a determination that the camera mode is not set to a photo capture mode means for capturing image sensor data from the single image sensor; and means for transmitting image sensor data from the single image sensor to one of the preview proxy module or the video proxy module.

Example 58 includes the subject matter of any of Examples 42-57, and further including, in response to a determination that the camera mode is set to a photo capture mode means for capturing image sensor data from the single image sensor and the other image sensors of the image sensor array; means for transmitting image sensor data from the single image sensor to one of the preview proxy module or the video proxy module based at least in part on the camera mode setting; means for encoding a photo using the image sensor data from the single image sensor; means for calculating depth data based on the image sensor data from one or more of the other image sensors of the image sensor array; means for inserting the depth data into metadata of the encoded photo; and means for outputting the photo including the depth data.

Example 59 includes the subject matter of any of Examples 42-58, and wherein the means for brokering the optical image data between the camera driver module and the preview output module comprises means for transmitting received image sensor data from the camera driver module to the preview output module.

Example 60 includes the subject matter of any of Examples 42-59, and wherein the means for brokering the optical image data between the camera driver module and the video output module comprises means for transmitting received image sensor data from the camera driver module to the video output module.

Example 61 includes the subject matter of any of Examples 42-60, and wherein the means for brokering the optical image data between the camera driver module and the photo output module comprises means for transmitting received image sensor data from the camera driver module to the photo output module.

The invention claimed is:

1. A computing device for controlling user access to image sensors of an image sensor array, the computing device comprising:
   a camera device that includes an image sensor array, wherein the image sensor array comprises a plurality of image sensors; and
   a camera driver module to (i) manage access to image data streams generated by each of the image sensors of the image sensor array, (ii) determine a user input mode setting of the camera device selected by a user of the computing device, (iii) expose image sensor data captured by a single image sensor of the image sensor array to the user of the computing device based at least in part on the selected user input mode setting while the other image sensors of the image sensor array, other than the exposed single image sensor, perform corresponding sensor functions to generate corresponding image sensor data, and (iv) restrict, while the camera device is in the selected user input mode setting, user access to the other image sensors of the image sensor array by not displaying settings of the other image sensors to the user of the computing device while the other image sensors of the image sensor array perform corresponding sensor functions.

2. The computing device of claim 1, wherein the plurality of image sensors comprises a primary image sensor and one or more secondary image sensors;
   wherein the camera driver module is further to (i) manage access to image data streams generated by the primary image sensor and the one or more secondary image sensors, (ii) expose the primary image sensor to the user of the computing device, and (iii) restrict user access to the one or more secondary image sensors of the image sensor array.

3. The computing device of claim 1, wherein the plurality of image sensors comprises one or more primary image sensors;
   wherein the camera driver module is further to (i) manage access to image data streams generated by each of the primary image sensors, (ii) expose a single primary image sensor to the user of the computing device, and (iii) restrict user access to other primary image sensors of the primary image sensors other than the single primary image sensor.

4. The computing device of claim 3, wherein the plurality of image sensors additionally comprises one or more secondary image sensors;

wherein the camera driver module is further to (i) manage access to image data streams generated by the one or more secondary image sensors and (ii) restrict user access to the one or more secondary image sensors.

5. The computing device of claim 3, wherein the camera driver module is further to select the primary image sensor from the plurality of image sensors of the image sensor array based on at least one of a supported resolution, a field of view, or a viewing angle.

6. The computing device of claim 1, wherein to expose the single image sensor comprises to expose an image data stream from the single image sensor to a software application capable of being executed by the computing device.

7. The computing device of claim 1, further comprising:
a plurality of output modules to process received image sensor data and output the processed image sensor data based on a camera mode setting of the camera device;
a plurality of proxy modules to broker each stream of optical image data from the camera driver module to a corresponding one of the plurality of output modules;
wherein the camera driver module is further to (i) determine the camera mode setting and a user input mode setting of the camera device, (ii) manage an enabled state of each of the single image sensor and the other image sensors of the image sensor array based at least in part on the user input mode setting, and (iii) transmit image sensor data received from the exposed single image sensor to one of the plurality of proxy modules based on the camera mode setting.

8. The computing device of claim 7, wherein, in response to a determination that the user input mode is set to a depth detect mode, the camera driver module is further to (i) enable the single image sensor for image sensor data capture, (ii) disable the other image sensors of the image sensor array, and (iii) transmit the image sensor data received from the exposed single image sensor to one of the plurality of proxy modules based on the camera mode setting.

9. The computing device of claim 7, wherein, in response to a determination that the camera mode setting is not set to a depth detect mode, the camera driver module is further to (i) enable the single image sensor and the other image sensors of the image sensor array for image sensor data capture and (ii) determine whether the camera device is set for photo capture.

10. The computing device of claim 9, wherein:
the plurality of output modules comprises a preview output module to process the received image sensor data and output a preview image based on the processed image sensor data, and a video output module to process the received image sensor data and output a video based on the processed image sensor data,
the plurality of proxy modules comprises a preview proxy module to broker the optical image data between the camera driver module and the preview output module, and a video proxy module to broker the optical image data between the camera driver module and the video output module, and
the camera driver module is further to, in response to a determination that the camera mode is not set to a photo capture mode, (i) capture image sensor data from the single image sensor and (ii) transmit the image sensor data from the single image sensor to one of the preview proxy module or the video proxy module.

11. The computing device of claim 10, wherein:
the plurality of output modules further comprises a photo output module to process received image sensor data and output a photo based on the received image sensor data,
the plurality of proxy modules further comprises a photo proxy module to broker the optical image data between the camera driver module and the photo output module,
the camera driver module is further to, in response to a determination that the camera mode is set to a photo capture mode, (i) capture image sensor data from the single image sensor and the other image sensors of the image sensor array, and (ii) transmit the image sensor data from the single image sensor to one of the preview proxy module or the video proxy module based at least in part on the camera mode setting, and
the photo proxy module is further to (i) encode a photo using the image sensor data from the single image sensor, (ii) calculate depth data based on the image sensor data from one or more of the other image sensors of the image sensor array, (iii) insert the depth data into metadata of the encoded photo, and (iv) output the photo including the depth data.

12. The computing device of claim 11, wherein to broker the optical image data between the camera driver module and the preview output module comprises to transmit received image sensor data from the camera driver module to the preview output module
wherein to broker the optical image data between the camera driver module and the video output module comprises to transmit received image sensor data from the camera driver module to the video output module, and
wherein to broker the optical image data between the camera driver module and the photo output module comprises to transmit received image sensor data from the camera driver module to the photo output module.

13. One or more non-transitory, computer-readable storage media comprising a plurality of instructions that in response to being executed cause a computing device to:
generate image data streams by each of a plurality of image sensors of an image sensor array of the computing device;
manage, by a camera driver module of the computing device, access to the generated image data streams;
determine, by a camera driver module, a user input mode setting of the camera device selected by a user of the computing device;
expose, by the camera driver module, image sensor data captured by a single image sensor to the user of the computing device based at least in part on the selected user input mode setting while the other image sensors of the image sensor array, other than the exposed single image sensor, perform corresponding sensor functions to generate corresponding image sensor data; and
restrict, while the camera device is in the selected user input mode setting, user access to other image sensors of the image sensor array by not displaying settings of the other image sensors to the user of the computing device while the other image sensors of the image sensor array perform corresponding sensor functions.

14. The one or more non-transitory, computer-readable storage media of claim 13, wherein to generate the image data streams by each of the plurality of image sensors of the image sensor array of the computing device comprises to generate the image data streams by each of a primary image sensor and one or more secondary image sensors;

wherein to expose the single image sensor to the user of the computing device comprises to expose the primary image sensor to the user of the computing device; and wherein to restrict user access to the other image sensors of the image sensor array other than the exposed single image sensor comprises to restrict user access to the one or more secondary image sensors of the image sensor array.

15. The one or more non-transitory, computer-readable storage media of claim 13, wherein to generate the image data streams by each of the plurality of image sensors of the image sensor array of the computing device comprises to generate the image data streams by each of a plurality of primary image sensors;

wherein to expose the single image sensor to the user of the computing device comprises to expose a single primary image sensor of the plurality of primary image sensors to the user of the computing device; and wherein to restrict user access to the other image sensors of the image sensor array other than the exposed single image sensor comprises to restrict user access to other primary image sensors of the plurality of primary image sensors other than the single primary image sensor.

16. The one or more non-transitory, computer-readable storage media of claim 15, wherein to generate the image data streams by each of the plurality of image sensors of the image sensor array of the computing device further comprises to generate the image data streams by each of one or more secondary image sensors; and wherein to restrict user access to the other image sensors of the image sensor array other than the single image sensor comprises to restrict user access to the one or more secondary image sensors.

17. The one or more non-transitory, computer-readable storage media of claim 15, further comprising a plurality of instructions that in response to being executed cause the computing device to;

select, by the camera driver module, the single primary image sensor from the plurality of primary image sensors based on at least one of a supported resolution, a field of view, or a viewing angle.

18. The one or more non-transitory, computer-readable storage media of claim 13, wherein to expose the single image sensor comprises to expose an image data stream from the single image sensor to a software application capable of being executed by the computing device.

19. The one or more non-transitory, computer-readable storage media of claim 13, further comprising a plurality of instructions that in response to being executed cause the computing device to:

determine a camera mode setting and a user input mode setting of the computing device;

manage an enabled state of each of the image sensors based at least in part on the user input mode setting;

transmit, by the camera driver module, image sensor data to one of a plurality of proxy modules based on the camera mode setting;

broker, by at least one of the plurality of proxy modules, each stream of optical image data from the camera driver module to a corresponding one of a plurality of output modules;

process, by at least one of the plurality of output modules, received image sensor data based at least in part on the camera mode setting of the computing device; and outputting the processed image sensor data to a display of the computing device.

20. The one or more non-transitory, computer-readable storage media of claim 19, further comprising a plurality of instructions that in response to being executed cause the computing device to: in response to a determination that the user input mode is set to a depth detect mode, (i) enable the single image sensor for image sensor data capture, (ii) disable the other image sensors of the image sensor array, and (iii) transmit image sensor data from the single image sensor to one of the plurality of proxy modules based on the camera mode setting.

21. The one or more non-transitory, computer-readable storage media of claim 19, further comprising a plurality of instructions that in response to being executed cause the computing device to: in response to a determination that the camera mode setting is not set to a depth detect mode, (i) enable the single image sensor and the other image sensors of the image sensor array for image sensor data capture, and (ii) determine whether the computing device is set for photo capture.

22. The one or more non-transitory, computer-readable storage media of claim 19, wherein to broker each stream of optical image data from the camera driver module to a corresponding one of the plurality of output modules comprises to:

broker, by a preview proxy module, a stream of optical image data from the camera driver module to a preview output module to process the received image sensor data and output a preview image based on the processed image sensor data;

broker, by a video proxy module, a stream of optical image data from the camera driver module to a video output module to process the received image sensor data and output a video based on the processed image sensor data; and broker, by a photo proxy module, a stream of optical image data from the camera driver module to a photo output module to process the received image sensor data and output a photo based on the processed image sensor data.

23. The one or more non-transitory, computer-readable storage media of claim 20, further comprising a plurality of instructions that in response to being executed cause the computing device to, in response to a determination that the camera mode is not set to a photo capture mode:

capture image sensor data from the single image sensor; and transmit the image sensor data from the single image sensor to one of a preview proxy module or a video proxy module.

24. The one or more non-transitory, computer-readable storage media of claim 20, further comprising a plurality of instructions that in response to being executed cause the computing device to, in response to a determination that the camera mode is set to a photo capture mode:

capture image sensor data from the single image sensor and the other image sensors of the image sensor array;

transmit the image sensor data from the single image sensor to one of a preview proxy module or a video proxy module based at least in part on the camera mode setting;

encode a photo using the image sensor data from the single image sensor;

calculate depth data based on image sensor data from one or more of the other image sensors of the image sensor array;

insert the depth data into metadata of the encoded photo; and output the photo including the depth data.

25. The one or more non-transitory, computer-readable storage media of claim 20, wherein to broker the optical image data between the camera driver module and the preview output module comprises to transmit received image sensor data from the camera driver module to the preview output module,
   wherein to broker the optical image data between the camera driver module and a video output module comprises to transmit received image sensor data from the camera driver module to the video output module, and
   wherein to broker the optical image data between the camera driver module and a photo output module comprises to transmit received image sensor data from the camera driver module to the photo output module.

\* \* \* \* \*